United States Patent
Ni et al.

(10) Patent No.: US 11,562,173 B2
(45) Date of Patent: Jan. 24, 2023

(54) METHOD, DEVICE, AND COMPUTER PROGRAM PRODUCT FOR MODEL UPDATING (71) Applicant: EMC IP Holding Company LLC, Hopkinton, MA (US)

(72) Inventors: Jiacheng Ni, Shanghai (CN); Jinpeng Liu, Shanghai (CN); Qiang Chen, Shanghai (CN); Zijia Wang, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 17/003,573

(22) Filed: Aug. 26, 2020

(65) Prior Publication Data
US 2022/0036129 A1 Feb. 3, 2022

(30) Foreign Application Priority Data
Jul. 31, 2020 (CN) .......................... 202010764694.1

(51) Int. Cl.
G06K 9/00 (2022.01)
G06K 9/62 (2022.01)
(Continued)

(52) U.S. Cl.
CPC ......... *G06K 9/6256* (2013.01); *G06K 9/6264* (2013.01); *G06V 20/20* (2022.01); *G06V 40/168* (2022.01)

(58) Field of Classification Search
CPC .. G06K 9/6256; G06K 9/6264; G06K 9/6268; G06V 20/20; G06V 40/168;
(Continued)

(56) References Cited

U.S. PATENT DOCUMENTS 11,227,187 B1 * 1/2022 Weinberger .............. G06N 3/04
2021/0271809 A1 * 9/2021 Huang ..................... G06N 5/04
(Continued)

OTHER PUBLICATIONS

K. Zhang et al., "Joint Face Detection and Alignment using Multi-task Cascaded Convolutional Networks," IEEE Signal Processing Letters, vol. 23, No. 10, 2016, pp. 1499-1503.
(Continued)

*Primary Examiner* — Md K Talukder
(74) *Attorney, Agent, or Firm* — Ryan, Mason & Lewis, LLP (57) ABSTRACT The present disclosure relates to a method, a device, and a computer program product for model updating. The method includes: acquiring a first image set and first annotation information, wherein the first annotation information indicates whether a corresponding image in the first image set includes a target object; updating a first version of an object verification model using the first image set and the first annotation information to obtain a second version, wherein the first version of the object verification model has been deployed to determine whether an input image includes the target object; determining the accuracy of the second version of the object verification model; and updating, if it is determined that the accuracy is lower than a preset accuracy threshold, the second version of the object verification model using a second image set and second annotation information to obtain a third version of the object verification model.

20 Claims, 4 Drawing Sheets (51) Int. Cl.
*G06V 20/20* (2022.01)
*G06V 40/16* (2022.01)

(58) Field of Classification Search
CPC .... G06V 10/774; G06V 10/82; G06V 40/161; G06V 10/776
See application file for complete search history.

(56) References Cited

U.S. PATENT DOCUMENTS

| | | | | |
|---|---|---|---|---|
| 2021/0374474 | A1* | 12/2021 | Shen | G06K 9/623 |
| 2021/0390706 | A1* | 12/2021 | Jie | G06V 10/774 |
| 2022/0083813 | A1* | 3/2022 | Du | G06V 10/764 |
| 2022/0171998 | A1* | 6/2022 | Ni | G06K 9/6257 |
| 2022/0172342 | A1* | 6/2022 | Zepeda Salvatierra | G06T 7/0004 |

OTHER PUBLICATIONS

F. Schroff et al., "FaceNet: A Unified Embedding for Face Recognition and Clustering," Proceedings of the IEEE Conference on Computer Vision and Pattern Recognition, arXiv:1503.03832v3, Jun. 17, 2015, 10 pages.

* cited by examiner

METHOD, DEVICE, AND COMPUTER PROGRAM PRODUCT FOR MODEL UPDATING

RELATED APPLICATION(S)

The present application claims priority to Chinese Patent Application No. 202010764694.1, filed Jul. 31, 2020 and entitled "Method, Device, and Computer Program Product for Model Updating," which is incorporated by reference herein in its entirety.

FIELD

The present disclosure generally relates to the field of artificial intelligence (AI), and more particularly relates to a method, an apparatus, a device, and a computer program product for model updating.

BACKGROUND

Currently, personal security has become an important issue that needs to be considered in various applications. Biological information recognition systems for object verification (for example, based on faces, voices, fingerprints, irises, etc.) have always been a technical focus. Image-based object verification, such as face verification, is one of the most popular techniques. The capturing of images requires no contact, is not invasive, and has no interference, so it is less objectionable and highly user-friendly. In addition, since image capture devices (for example, cameras) have been widely deployed in various terminal devices, including Internet of Things (IoT) devices, compared with other verification systems that require additional devices such as fingerprint sensors and iris sensors, verification systems based on image information do not require additional information capture devices. In recent years, with the development of AI technologies, object verification systems based on machine learning models have also been developed, which can improve the efficiency and accuracy of object verification.

SUMMARY

According to some embodiments of the present disclosure, a model updating solution is provided.

In a first aspect of the present disclosure, a model updating method is provided. The method includes: acquiring a first image set and first annotation information, wherein the first annotation information indicates whether a corresponding image in the first image set includes a target object; updating a first version of an object verification model using the first image set and the first annotation information to obtain a second version of the object verification model, wherein the first version of the object verification model has been deployed to determine whether an input image includes the target object; determining the accuracy of the second version of the object verification model; and updating, if it is determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

In a second aspect of the present disclosure, an electronic device is provided. The electronic device includes: at least one processor; and at least one memory storing computer program instructions, wherein the at least one memory and the computer program instructions are configured to cause, together with the at least one processor, the electronic device to perform actions. The actions include: acquiring a first image set and first annotation information, wherein the first annotation information indicates whether a corresponding image in the first image set includes a target object; updating a first version of an object verification model using the first image set and the first annotation information to obtain a second version of the object verification model, wherein the first version of the object verification model has been deployed to determine whether an input image includes the target object; determining the accuracy of the second version of the object verification model; and updating, if it is determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

In a third aspect of the present disclosure, a computer program product is provided, which is tangibly stored on a non-volatile computer-readable medium and comprises computer-executable instructions, wherein the computer-executable instructions, when executed, cause a device to perform actions. The actions include: acquiring a first image set and first annotation information, wherein the first annotation information indicates whether a corresponding image in the first image set includes a target object; updating a first version of an object verification model using the first image set and the first annotation information to obtain a second version of the object verification model, wherein the first version of the object verification model has been deployed to determine whether an input image includes the target object; determining the accuracy of the second version of the object verification model; and updating, if it is determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

BRIEF DESCRIPTION OF THE DRAWINGS

The above and other objects, features, and advantages of the embodiments of the present disclosure will become easily understandable by reading the following detailed description with reference to the accompanying drawings. In the accompanying drawings, several embodiments of the present disclosure are shown by way of example and not limitation, wherein.

DETAILED DESCRIPTION

Hereinafter, illustrative embodiments of the present disclosure will be described in more detail with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example embodiment" and "one embodiment" mean "at least one example embodiment." The term "another embodiment" means "at least one further embodiment." The terms "first," "second," and the like may refer to different or identical objects. Other explicit and implicit definitions may also be included below.

As used herein, the term "model" can learn a correlation between corresponding inputs and outputs from training data, so that a corresponding output can be generated for a given input after the training is completed. The generation of a model can be based on machine learning technologies. Deep learning is a machine learning algorithm that uses multiple layers of processing units to process inputs, and provides corresponding outputs. The neural network model is an example of a model based on deep learning. Herein, "model" may also be referred to as "machine learning model," "learning model," "machine learning network," or "learning network," and these terms are used interchangeably herein.

Generally, machine learning may include three stages, namely, the training stage, the testing stage, and the using stage (also referred to as the inference stage). In the training phase, a given model may be trained using a large amount of training data, and iterations are continuously performed until the model can obtain, from the training data, consistent inferences similar to inferences that can be made by human intelligence. Through training, the model can be considered to be able to learn the correlation between inputs to outputs (also referred to as mapping from inputs to outputs) from the training data. The model may be represented as a function for mapping inputs to outputs. The parameter values of the trained model are determined. In the testing phase, test inputs are applied to the trained model to test whether the model can provide correct outputs, thereby determining the performance of the model. In the using phase, the model can be used to process actual inputs based on the parameter values obtained through training to determine corresponding outputs.

Object verification technologies based on machine learning models can realize automatic and efficient object verification. However, the training of an object verification model consumes a lot of computing resources, so frequent retraining of the model is usually not feasible. However, in an object verification task, new features of the object to be verified may appear, for example, a face image from a new angle or a face image with a new expression will be collected during face verification. Since these new features were not captured in the previous training process, the object verification model may not be able to perform correct object verification. Therefore, it is expected that the applied object verification model has high robustness and can be adapted to the tracking of new features.

Figure 1:
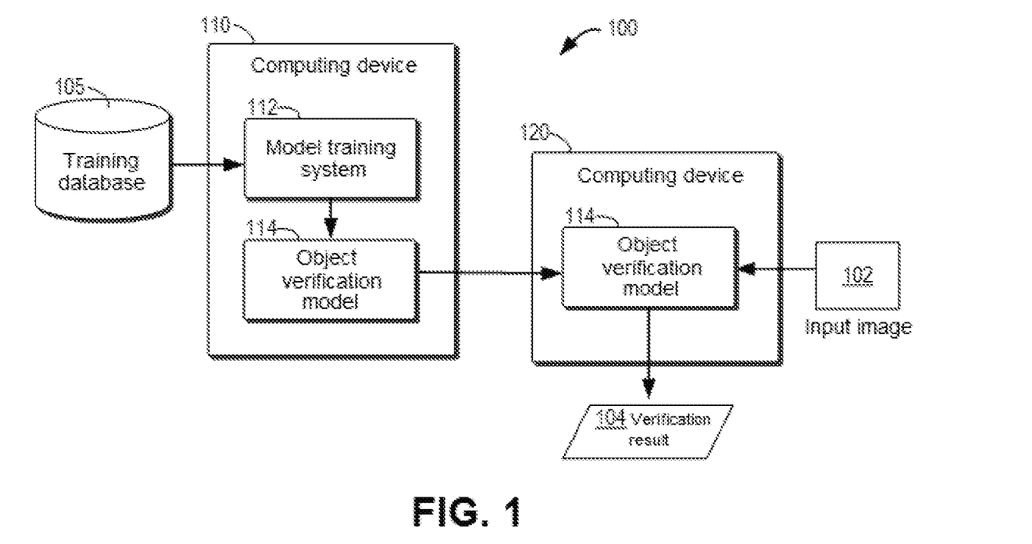
FIG. 1 shows an example environment for object verification in which embodiments of the present disclosure can be implemented.

FIG. 1 shows an example environment for object verification in which embodiments of the present disclosure can be implemented. As shown in FIG. 1, example environment 100 includes computing device 110, and computing device 110 includes model training system 112 for training and generating object verification model 114. Object verification model 114 may be deployed into another computing device, such as computing device 120.

Computing device 120 may use object verification model 114 to verify whether input image 102 includes a target object, and obtain verification result 104. In some embodiments, object verification model 114 obtained through training by computing device 110 may be deployed into multiple computing devices, in order for each computing device to perform corresponding object verification.

Computing devices 110 and 120 may be any devices with computing capabilities. Computing device 110 used for model training may have relatively powerful computing capabilities, for example, it can be a centralized server, a distributed server, a mainframe, an edge computing device, or a cloud. Computing device 120 for using the model may be, for example, a portable or fixed terminal device, including an IoT device, a tablet computer, a desktop computer, a notebook computer, a mobile phone, a general-purpose computing device, and the like. However, only some examples of computing devices are given above, and the training and computing of the model can be implemented by any type of computing devices.

Although shown as a single device, computing device 110 or 120 may be implemented by multiple physical devices. Of course, in some cases, model training and model using can also be implemented on the same device or the same group of devices. This depends on needs of an actual deployment of computing resources.

Specific functions of object verification model 114 may be supported by, for example, software, hardware, firmware, or any combination of the foregoing. Object verification model 114 may be configured and trained to verify whether an image includes a target object. The model structure of object verification model 114 can be configured as any model structure capable of supporting image processing and object verification. An example model includes the Facenet model. However, object verification model 114 can be configured using any model structure currently available or developed in the future. In the embodiments of the present disclosure, the specific configuration of object verification model 114 is not limited.

Object verification is required in many applications, especially in areas that need to protect personal information or property security, such as smart homes and home appliances in IoT systems, personal terminal devices, and the like. In some examples, the target object to be verified may include a target face. By performing face verification with object verification model 114, the target user can be granted corresponding permissions, for example, permissions of turning on and controlling smart home appliances and household devices, such as lights, doors, windows, refrigerators, multimedia devices, irrigation systems, and so on. Of course, these are just some example applications of object validation. Object verification may also be used in many other applications.

In some embodiments, the object verification process can be roughly divided into three stages, including object detection and alignment (or normalization), object feature extraction, and object verification. In the object detection and alignment stage, an object region (for example, a face region) is detected from input image 102, and geometric characteristics of the detected object region can be normalized. For example, the normalization of the object region may include adjusting facial features (eyes, nose, mouth, etc.) of the face to positions similar to the positions on a reference face. The object feature extraction stage includes detecting and extracting feature vectors from the image, specifically the object region of the image, wherein the extracted feature vectors can characterize characteristics of the object.

The object verification phase is to verify whether the object in current input image 102 is the target object. To this end, the difference between a reference feature vector extracted from the reference image including the target object and the currently extracted feature vector can be calculated. This difference can be determined, for example, by various vector distance calculation formulas. If the calculated difference is small (for example, less than a threshold), it can be determined that the current image includes the target object, so the verification is passed.

In the above object verification process, object detection and alignment can be completed by another machine learning model or can be implemented by other means than machine learning models. In some embodiments, object verification model 114 may be configured to perform extraction of feature vectors on the basis of a result of object detection. Object verification model 114 may also include a verification module for determining a final verification result, that is, whether the current input image includes the target object. Of course, in some embodiments, object verification model 114 may also include the functions of object detection and alignment. In the object verification process, the extraction of feature vectors is important because it may determine the final verification result.

In the training process, computing device 110 may obtain, from training database 105, training data for training object verification model 114. The training data may include various training images in which corresponding objects are presented. Depending on the training method used, the training data may also include annotation information about the training image, which indicates whether the training image includes a certain target object. Computing device 110 can use various model training techniques to enable object verification model 114 to extract, from the image, feature vectors that are particularly helpful for characterizing the object, thus providing an accurate verification result.

As mentioned above, since new features of the object may appear during the use of the model, and such features may not be included in the original training data, the object verification model is not sensitive to such features, resulting in reduced verification accuracy.

In machine learning applications, the machine learning model can be updated by online machine learning methods. Online machine learning refers to obtaining, after the model training is completed, new training data to update the model. However, the computing overhead required for model training is relatively large, especially when training is performed on the basis of the full training data set. If a pure online machine learning technique is used, that is, the model is updated one more time whenever a new training sample is obtained, the computing overhead of each update is small, but it may cause model parameters to be unstable, and the total computing overhead of frequent updates will also increase. In addition, for models with nonlinear operations, too few training samples will not be able to implement model updating.

An embodiment of the present disclosure proposes a solution for adaptive model updating. This solution uses different scales of training data to update the model in stages to achieve a balance between model updating speed and computing overhead. Specifically, a first image set and associated first annotation information are captured during the use of the object verification model. The first image set and the first annotation information are used to update a first version of the object verification model to obtain a second version. The number of images in the first image set may be small, so that the computing overhead of this update is constrained. Then, the accuracy of the second version of the object verification model is determined.

If the accuracy is lower than a preset accuracy threshold, a second image set and associated second annotation information are used to update the second version of the object verification model. The number of images in the second image set is greater than that in the first image set, and this enables continuation of the training of a more accurate model on the basis of a larger scale of training samples.

By performing model updating based on the combination of a small training data set and a large training data set, the problem of computing overhead can be solved, and the accuracy of the model can also be ensured to avoid serious degradation of model accuracy.

Hereinafter, some example embodiments of the present disclosure will be described with reference to the accompanying drawings.

Figure 2:
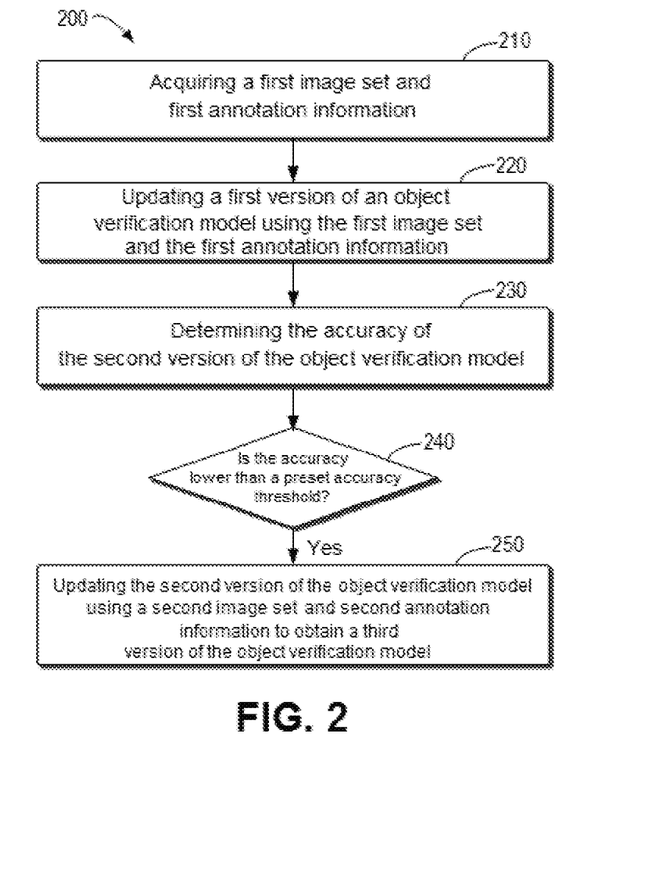
FIG. 2 shows a flowchart of a method for model updating according to some embodiments of the present disclosure.

FIG. 2 shows a flowchart of model updating process 200 according to some embodiments of the present disclosure. Process 200 may be implemented by computing device 110 in FIG. 1, for example, by model training system 112 in computing device 110. To facilitate discussion, process 200 will be described below with reference to FIG. 1.

In block 210, model training system 112 acquires a first image set and first annotation information. The first annotation information indicates whether a corresponding image in the first image set includes a target object. As will be described below, the first image set and the first annotation information are used to update object verification model 114. The first image set and the first annotation information can be considered as new training data for object verification model 114.

Generally, when new training data is captured, the annotation of the new training data is costly. In some embodiments, the first image set and the first annotation information may be collected in the use of the current version (referred to as a "first version") of object verification model 114. Specifically, in some embodiments, at least one input image and the verification result corresponding to the at least one image collected in the use of the first version of object verification model 114 can be acquired for the determination of the first image set and the first annotation information. In use, the first image set and its annotation information can be automatically obtained in various ways without subsequent manual annotating, thus reducing the cost of training data.

In order to facilitate the understanding of the acquisition of the first image set and its first annotation information, object verification process 300 will be described with reference to FIG. 3. This object verification process 300 is implemented by a computing device, such as computing device 120, which is deployed with the first version of object verification model 114. Computing device 120 performs object verification process 300 to determine a verification result. The verification result is used to determine the user's permission. This permission includes, for example, access permission, control permission, modification permission, etc., for specific devices, functions, services, and the like. If the verification is passed, computing device 120 determines that the current user, such as the user who provided input image 102, has the permission. Otherwise, computing device 120 determines that the current user cannot obtain the corresponding permission.

Figure 3:
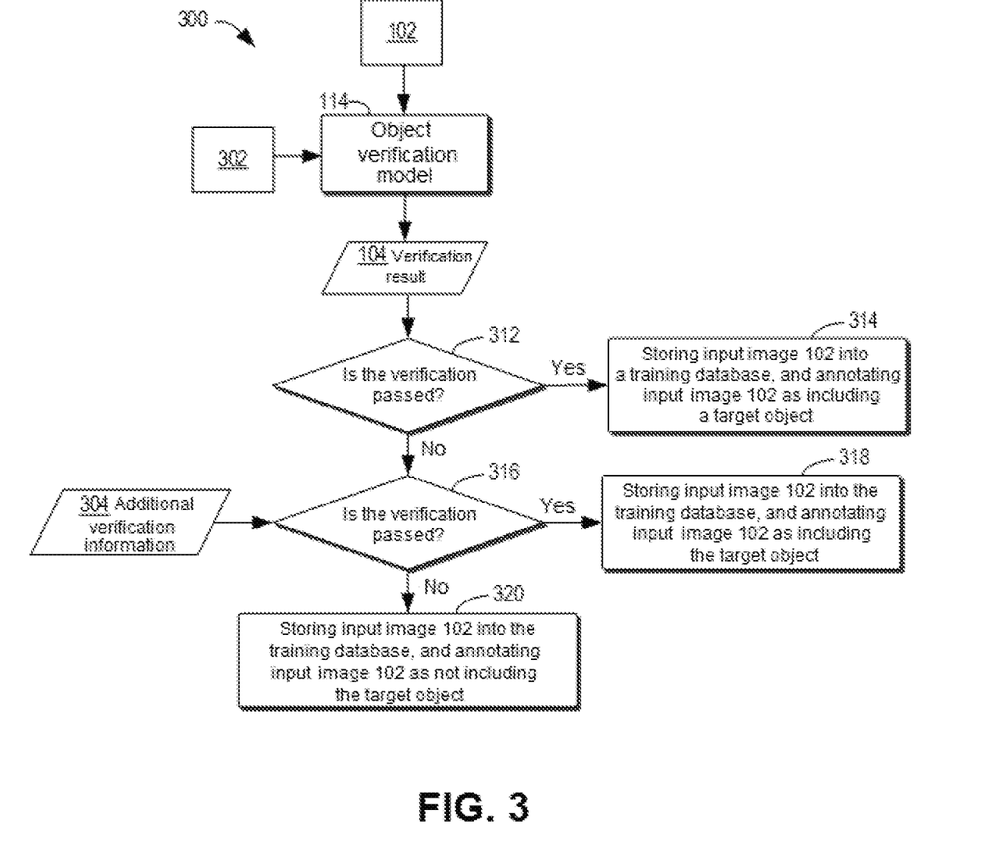
FIG. 3 shows a flowchart of an object verification process according to some embodiments of the present disclosure.

As shown in FIG. 3, input image 102 to be verified is first verified by object verification model 114 to determine verification result 104. Object verification model 114 also generates verification result 104 with the aid of reference image 302.

For example, reference image 302 may be an image that is provided in advance and determined to include the target object. Reference image 302 may be an image that is provided by the user and includes the target object. In a face verification application, reference image 302 may be a face image provided by the user during a user registration stage. As introduced above, object verification model 114 extracts feature vectors from input image 102. The difference between the extracted feature vectors and the feature vectors extracted from reference image 302 is used to determine whether input image 102 includes the target object. If object verification model 114 is deployed into different applications, by replacing reference image 302, object verification model 114 can perform verification for different target objects.

In block 312, computing device 120 determines, based on verification result 104 from object verification model 114, whether the verification based on object verification model 114 is passed. If verification result 104 indicates that input image 102 includes the target object, it means that the verification is passed. Computing device 120 may determine that the current user, for example, an object presented in input image 102, can obtain the required permission. In addition, in block 314, computing device 120 stores input image 102 into a training database, for example, training database 105. In this case, input image 102 is annotated as including the target object.

If verification result 104 indicates that input image 102 does not include the target object, in some applications, computing device 120 may also continue the verification process based on additional verification information 304. Additional verification information 304 may include, for example, information such as a password, a fingerprint, and a token. In block 316, computing device 120 determines whether the verification based on additional verification information 304 is passed. If the verification is passed, computing device 120 can determine that the current user, that is, the user who provided the verification information, has the permission.

If the user provides input image 102 and additional verification information 304 in the same verification process, computing device 120 can determine that the user has not changed. Therefore, in some embodiments, after the verification in block 316 is passed, computing device 120 may also store input image 102 into training database 105 in block 318. At this time, input image 102 may also be annotated as including the target object. This is because, although the current object verification model 114 fails to pass the verification, additional verification information 304 assists in verifying the existence of the target object. Therefore, input image 102 may contain features that object verification model 114 currently fails to capture, and can be provided as new training data for subsequent model updating.

In some embodiments, if the verification based on additional verification information 304 still fails, it means that the current user, for example, the object presented in the input image, does not have the permission. In block 320, computing device 120 may also store input image 102 into training database 105, and input image 102 is annotated as not including the target object.

In some embodiments, the first image set may include multiple input images captured by computing device 120 during the use of object verification model 114, such as the input images discussed above with reference to FIG. 3. The input images captured in real time can be provided into training database 105 for storage. In addition, the input images have been annotated accordingly, so the first annotation information can also be confirmed accordingly.

In some embodiments, the first image set may also include reference image 302 provided for verification by the object verification model. Since reference image 302 is known to include the target object, the first annotation information may indicate that reference image 302 includes the target object.

Hereinbefore, example embodiments of the manner of acquiring the first image set and the first annotation information have been discussed. In other embodiments, part or all of the first image set and the first annotation information may also be obtained in other manners, and the embodiments of the present disclosure are not limited in this respect. In some embodiments, if images related to multiple target objects are captured, the first annotation information may also indicate a specific target object included in each of the images.

In block 220, model training system 112 uses the first image set and the first annotation information to update the first version of object verification model 114 to obtain another version (referred to as a "second version") of object verification model 114. The first version of object verification model 114 may be a model that was previously trained and deployed into one or more computing devices (e.g., computing device 120) for use.

The first version of object verification model 114 may include an initial version, or a later updated version of object verification model 114. When the initial version of object verification model 114 is generated, a large training data set (for example, a training data set from training database 105), that is, a training data set that includes more images and associated annotation information, can usually be used to support model training.

In order to make object verification model 114 more accurate and adapt to new features of the object, in an embodiment of the present disclosure, the first version of object verification model 114 is updated by using the captured first image set and first annotation information to obtain the second version. The updating of object verification model 114 refers to the fine-tuning of the model, which involves the training process of the model. In some embodiments, the model updating may be performed after the first image set having a preset quantity is collected. In some embodiments, the model updating may be performed periodically using the collected first image set.

In some embodiments, since the number of images in the first image set is small, that is, the training sample set is small, training based on mini-batch stochastic gradient descent can be used to update the first version of object verification model 114. In some embodiments, model training system 112 may construct a corresponding objective function (referred to as a first objective function) to perform model training that is based on the first image set and the first annotation information. The first objective function can be constructed as a loss function or a cost function. The realization of the objective of training includes causing the first objective function to reach a convergence condition (referred to as a first convergence condition).

Since the number of training samples in the first image set is small, and in order to save computing overhead, in some embodiments, model training system 112 selects an objective function that can relatively easily meet the convergence condition to perform model updating. In some embodiments, model training system 112 may determine the first objective function based on a triplet loss function to guide the model updating process.

In the model updating process based on the triplet loss function, multiple triplet training samples need to be constructed from the first image set. Each triplet training sample includes an anchor sample, a positive sample, and a negative sample. The anchor sample and the positive sample include images that present the same object, for example, images that include a target object. The negative sample includes an image that presents a different object from that of the anchor sample and positive sample. Based on the first annotation information indicating whether the image includes the target object, it can be determined how to construct the triplet training sample.

In some examples, object verification model 114 is represented as function $f(x) \in R^d$, where x represents an input image x, and object verification model 114 can convert the input image x into a d-dimensional feature vector, and has a constraint condition $\|f(x)\|=1$. In the case of such representation of object verification model 114, the triplet loss function can be represented as:

$$\|f(x_i^a)-f(x_i^p)\|_2^2+\alpha < \|f(x_i^a)-f(x_i^n)\|_2^2 \quad \text{(Formula 1)}$$

$x_i^a$ represents the anchor sample in the ith triplet training sample, $x_i^a$ represents the positive sample in the ith triplet training sample, $x_i^n$ represents the negative sample in the ith triplet training sample, and $\| \|_2^2$ represents the difference (or similarity) between feature vectors extracted from the two samples by object verification model 114. Since a feature vector can be understood as a multi-dimensional vector, the similarity or difference between two feature vectors can be determined by any method suitable for measuring the difference of vectors. In an example, the difference between two feature vectors can be determined based on a Euclidean distance, and the greater the distance, the greater the difference between the two feature vectors and the smaller the similarity.

In Formula (1), $\alpha$ represents the minimum interval between a first difference between the feature vectors of the anchor sample and the positive sample and a second difference between the feature vectors of the anchor sample and the negative sample. $\alpha$ is a hyper-parameter of the model, which may be configured as a preset value based on experience or in other possible ways.

Figure 4:
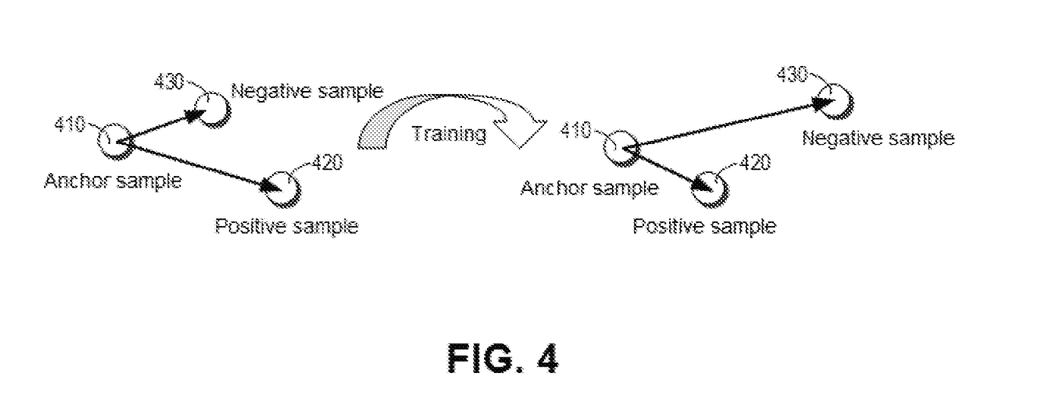
FIG. 4 shows a schematic diagram of the distance between a triplet of training samples before and after learning according to some embodiments of the present disclosure.

Based on the triplet loss function, the objective of model training is to cause the anchor sample $x_i^a$ of a specific target object to be closer to the positive sample $x_i^p$ (that is, the distance between their feature vectors is smaller), being smaller than the distance between the anchor sample $x_i^a$ and the negative sample $x_i^n$ (that is, the distance between their feature vectors) and the interval $\alpha$. FIG. 4 shows the relationship of distances between a triplet training samples before and after training. Before training, the distance between anchor sample 410 and positive sample 420 may be greater, while the distance between anchor sample 410 and negative sample 430 may be smaller. After training, it is expected that the distance between anchor sample 410 and positive sample 420 is shortened, and the distance between anchor sample 410 and negative sample 430 is lengthened.

Therefore, based on the triplet loss function, the first objective function can be constructed to cause the following loss function to reach the convergence condition:

$$\sum_i^N [\|f(x_i^a)-f(x_i^p)\|_2^2 - \|f(x_i^a)-f(x_i^n)\|_2^2 + \alpha]_+ \quad \text{(Formula 2)}$$

In Formula (2), N represents the number of triplet training samples constructed from the first image set, $[\ ]_+$ represents: if the value in $[\ ]_+$ is greater than zero, this value is determined as the triplet loss; and if the value in $[\ ]_+$ is less than or equal to zero, the triplet loss is zero. If the above formula reaches the convergence condition, for example, minimization, the training is complete. In some embodiments, when the anchor sample $x_i^a$ is given, the positive sample $x_i^a$ and the negative sample $x_i^n$ can be randomly selected. In some embodiments, in order to improve the efficiency of model training, when the anchor sample $x_i^a$ and the positive sample $x_i^a$ have been selected, a negative sample $x_i^n$ can be selected so that the negative sample $x_i^n$ meets the following condition:

$$\|f(x_i^a)-f(x_i^n)\|_2^2-\|f(x_i^a)-f(x_i^p)\|_2^2 < \alpha \quad \text{(Formula 3)}$$

The triplet training samples constructed in this way are more "difficult." Being more "difficult" refers to the fact that: in a triplet training sample, the distance between the difference between the anchor sample and the negative sample and the difference between the anchor sample and the positive sample is small. Therefore, object verification model 114 needs to learn parameter values more accurately so as to be able to correctly distinguish between positive samples and negative samples.

Hereinbefore, the model updating based on a triplet loss function has been discussed. The convergence condition of the triplet loss function is usually easy to achieve, and by transforming the triplet training samples, the convergence condition can be met on the basis of a small scale of training data. Therefore, the triplet loss function is particularly suitable for the model training process based on mini-batch stochastic gradient descent. In other embodiments, the objective function of model training can also be determined based on other loss functions or cost functions, so as to complete model training, as long as the selected objective function can achieve convergence of the model on the basis of the first image set.

In some embodiments, in order to avoid a great impact of model updating, which is based on a small scale of training data, on the accuracy, model training system 112 may also train the first version of object verification model 114 based on a small preset learning rate. For example, this learning rate is less than a preset threshold. In model training, the magnitude of the learning rate determines how fast parameters of a model move to an optimal value. By setting a small preset learning rate, rapid changes in the parameter values of object verification model 114 can be avoided, thereby limiting the impact on the accuracy as much as possible.

Continuing to refer to FIG. 2, after the model updating based on the first image set and the first annotation information, in block 230, model training system 112 determines the accuracy of the obtained second version of object verification model 114. Model training system 112 may determine the accuracy through a model verification process. For example, model training system 112 selects a set of images for model verification from training database 105, uses the second version of object verification model 114 to process the images, and determines whether the verification result matches a known verification result. Any other method for testing model accuracy is also feasible.

In block 240, model training system 112 determines whether the accuracy of the second version of object verification model 114 is lower than a preset accuracy threshold. The preset accuracy threshold may be set to an acceptable accuracy.

In some cases, if the accuracy of the second version of object verification model 114 is lower than the preset accuracy threshold, in block 250, model training system 112 uses a second image set and second annotation information to update the second version of object verification model 114 again in order to obtain a third version of object verification model 114. The number of images in the second image set is greater than the number of images in the first image set, and the second annotation information indicates whether the corresponding image in the second image set includes a desired object. Since the use of the first image set causes the accuracy of the model to decline, in an embodiment of the present disclosure, model training system 112 uses a larger training data set to re-train object verification model 114.

In some embodiments, the second image set may include a training data set that has already been stored in training database 105, for example, a data set for model training in the initial result. In some embodiments, the second image set may include the first image set, and the second annotation information may also accordingly include the first annotation information. That is to say, in the current stage of update, in addition to the historically used training data, the newly captured training data can also be used together to re-train object verification model 114.

A larger scale of training data can significantly correct model parameters, thereby improving the accuracy of the model. In some embodiments, model training system 112 may construct a corresponding objective function (referred to as a second objective function) to perform model training based on the second image set and the second annotation information. The second objective function can be constructed as a loss function or a cost function. The realization of the objective of training includes causing the second objective function to meet a convergence condition (referred to as a second convergence condition).

Since the training data set is more sufficient and, in order to improve the accuracy of the model, the second objective function can be designed to be more complex, so that the complexity of meeting the second convergence condition is greater than the complexity of meeting the first convergence condition. For example, model training system 112 may determine the second objective function based on a loss function such as softmax loss and perceptron loss. Model training system 112 may also use training based on batch stochastic gradient descent, so as to perform model training based on the second image set and the second annotation information. It should be understood that any other appropriate loss function or cost function can also be used to support model training.

By first performing model updating with a small data-scale image set, and then performing model updating using a large-scale image set when the accuracy declines, a balance between computing resource overhead and model accuracy can be achieved.

In some embodiments, if the accuracy of the second version of object verification model 114 meets a preset accuracy threshold (for example, greater than or equal to the preset accuracy threshold), computing device 120 may deploy the second version of object verification model 114 to computing device 120, for use to replace the version currently used by computing device 120. Since the second version of object verification model 114 after the update learns new features of the target object from the newly acquired first image, the second version of object verification model 114 will be able to perform object verification more accurately.

In some embodiments, after the second version of object verification model 114 has been used for a period of time, the current version of object verification model 114 may be updated again based on a new image set captured during this period and the corresponding annotation information. The updating here is similar to the updating of the "first version" of object verification model 114 previously discussed. That is, in the situation that the accuracy does not decrease, the newly captured small-scale image set can be used to iterate the versions of object verification model 114 multiple times.

In some embodiments, when object verification model 114 is updated, the first image set and/or the second image set may be preprocessed to obtain a preprocessing result suitable as an input to object verification model 114. In some embodiments, the preprocessing may include object detection and/or alignment of the images to determine and/or normalize an object region in each image in the first image set. Object detection and/or alignment can be achieved by another model, or can be performed by other means. Of course, if object verification model 114 itself is designed to have object detection and/or alignment functions, there is no need to perform such preprocessing. In addition, other appropriate preprocessing is also possible.

Figure 5:
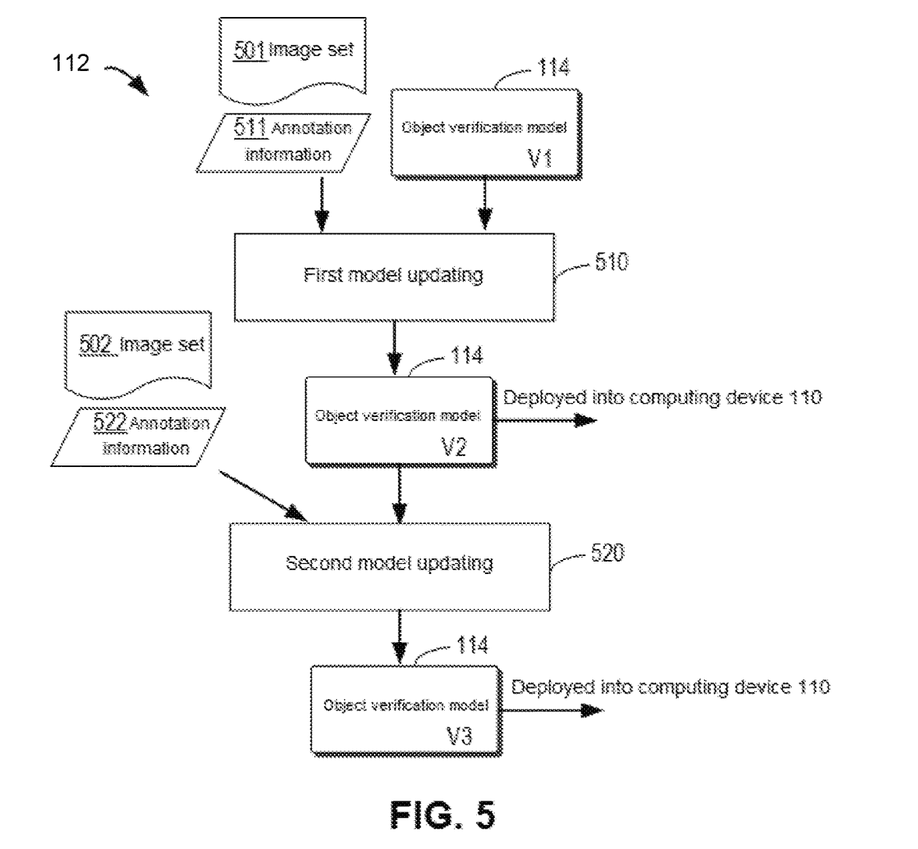
FIG. 5 shows a schematic block diagram of a model training system according to some embodiments of the present disclosure.

FIG. 5 shows a schematic block diagram of model training system 112 according to some embodiments of the present disclosure. Model training system 112 includes first model updating module 510, which is configured to acquire first image set 501 and associated annotation information 511, and perform updating on a first version (V1) of object verification model 114 to obtain a second version (V2) of object verification model 114. If the accuracy of the second version (V2) of object verification model 114 is greater than a preset accuracy threshold, this version can be deployed into computing device 110 for use.

If the accuracy of the second version (V2) of object verification model 114 is lower than the preset accuracy threshold, model training system 112 further includes second model updating module 520, which is configured to acquire first image set 502 and associated annotation information 522, and perform updating on the second version (V2) of object verification model 114 to obtain a third version (V3) of object verification model 114. This version can be deployed into computing device 110 for use.

Figure 6:
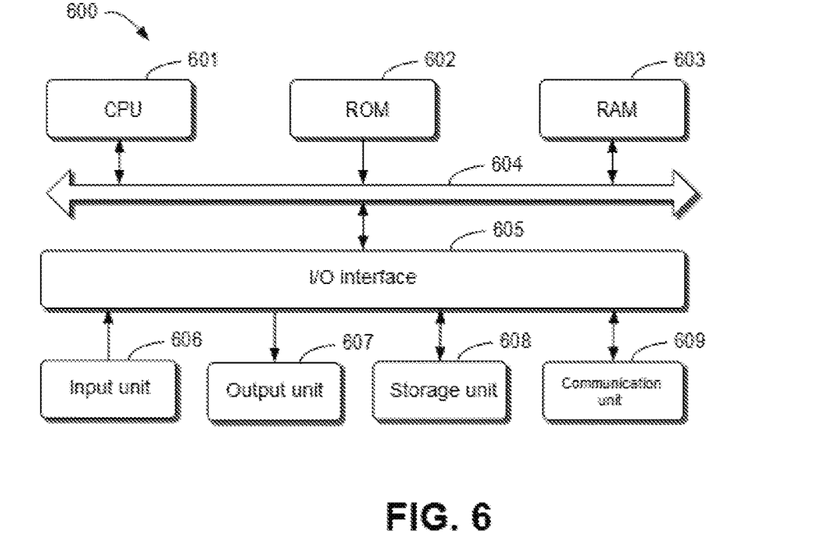
FIG. 6 shows a block diagram of a computing device in which one or more embodiments of the present disclosure may be implemented.

FIG. 6 schematically shows a block diagram of device 600 that can be used to implement embodiments of the present disclosure. It should be understood that device 600 shown in FIG. 6 is only an example, and should not constitute any limitation to the function and scope of the embodiments described herein. Device 600 shown in FIG. 6 may be used to implement process 200 of FIG. 2. Device 600 shown in FIG. 6 may be implemented as or included in computing device 110 of FIG. 1 or model training system 112 therein. Device 600 shown in FIG. 6 may be implemented as or included in computing device 120 of FIG. 1.

As shown in FIG. 6, device 600 includes central processing unit (CPU) 601, which can perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as process 200, may be performed by CPU 601. For example, in some embodiments, process 200 may be implemented as a computer software program that is tangibly included in a machine-readable medium, for example, storage unit 608. In some embodiments, some or all of the computer program may be loaded and/or installed onto device 600 through ROM 602 and/or communication unit 609. When the computer program is loaded into RAM 603 and executed by CPU 601, one or more steps of process 200 described above may be implemented.

The embodiments of the present disclosure may further provide a computer-readable storage medium having computer-executable instructions stored thereon, wherein the computer-executable instructions are executed by a processor to implement the method described above. According to an example embodiment of the present disclosure, a computer program product is further provided, which is tangibly stored on a non-transitory computer-readable medium and includes computer-executable instructions, wherein the computer-executable instructions are executed by a processor to implement the method described above.

Various aspects of the present disclosure are described herein with reference to flowcharts and/or block diagrams of the method, the apparatus, the device, the computer-readable medium, and the computer program product according to embodiments of the present disclosure. It should be understood that each block in the flowcharts and/or block diagrams and a combination of blocks in the flowcharts and/or block diagrams may be implemented by computer-readable program instructions.

These computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible embodiments of the system, the method, and the computer program product according to a plurality of embodiments of the present disclosure. In this regard, each block in the flowcharts or block diagrams may represent a module, a program segment, or part of an instruction, wherein the module, program segment, or part of an instruction includes one or more executable instructions for implementing specified logical functions. In some alternative embodiments, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

As used herein, the term "determine" encompasses a variety of actions. For example, "determine" may include operating, computing, processing, exporting, surveying, searching (for example, searching in a table, database, or another data structure), identifying, and the like. In addition, "determine" may include receiving (for example, receiving information), accessing (for example, accessing data in a memory), and the like. In addition, "determine" may include parsing, selecting, choosing, establishing, and the like.

Various embodiments of the present disclosure have been described above. The above description is illustrative rather than exhaustive, and is not limited to the various embodiments disclosed. Numerous modifications and alterations are apparent to those of ordinary skill in the art without departing from the scope and spirit of the illustrated various embodiments. The selection of terms as used herein is intended to best explain the principles and practical applications of the various embodiments or improvements to technologies on the market, and to otherwise enable persons of ordinary skill in the art to understand the various embodiments disclosed herein.

What is claimed is:

1. A model updating method, comprising:
   acquiring a first image set and first annotation information, wherein the first annotation information indicates whether a corresponding image in the first image set includes a target object;
   updating a first version of an object verification model using the first image set and the first annotation information to obtain a second version of the object verification model, wherein the first version of the object verification model has been deployed to determine whether an input image includes the target object;
   determining the accuracy of the second version of the object verification model; and
   updating, responsive to it being determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

2. The method according to claim 1, wherein acquiring the first image set and the first annotation information comprises:
   acquiring at least one input image collected in the use of the first version of the object verification model and a verification result corresponding to the at least one image, wherein the verification result indicates whether the at least one image includes the target object;
   including the at least one input image into the first image set; and
   determining the first annotation information based on the verification result.

3. The method according to claim 2, wherein acquiring the at least one input image comprises acquiring at least one of the following:
   a first input image that is determined by the object verification model to include the target object, wherein the first annotation information is determined to indicate that the first input image includes the target object,
   a second input image that is determined by the object verification model to not include the target object, wherein the verification result of the object verification model is used to determine a permission, an object in the second input image is determined to have the permission, and the first annotation information is determined to indicate that the second input image includes the target object, and
   a third input image that is determined by the object verification model to not include the target object, wherein an object in the third input image is determined to not have the permission, and the first annotation information is determined to indicate that the second input image does not include the target object,
   a reference image that is provided for verification by the object verification model, wherein the first annotation information is determined to indicate that the reference image includes the target object.

4. The method according to claim 1, wherein updating the first version of the object verification model comprises:
   training the first version of the object verification model using the first image set and the first annotation information to meet a first convergence condition of a first objective function; and
   wherein updating the second version of the object verification model comprises:
   training the second version of the object verification model using the second image set and the second annotation information to meet a second convergence condition of a second objective function, wherein the complexity of meeting the second convergence condition is greater than the complexity of meeting the first convergence condition.

5. The method according to claim 1, wherein updating the first version of the object verification model comprises:
   updating the first version of the object verification model using training that is based on mini-batch stochastic gradient descent.

6. The method according to claim 1, wherein updating the first version of the object verification model comprises:
   training the first version of the object verification model based on a preset learning rate using the first image set and the first annotation information, wherein the preset learning rate is less than a preset threshold.

7. The method according to claim 1, wherein the target object comprises a target face.

8. An electronic device, comprising:
   at least one processor; and
   at least one memory storing computer program instructions, wherein the at least one memory and the computer program instructions are configured to cause, together with the at least one processor, the electronic device to perform actions including:
   acquiring a first image set and first annotation information, wherein the first annotation information indicates whether a corresponding image in the first image set includes a target object;
   updating a first version of an object verification model using the first image set and the first annotation information to obtain a second version of the object verification model, wherein the first version of the object verification model has been deployed to determine whether an input image includes the target object;
   determining the accuracy of the second version of the object verification model; and
   updating, responsive to it being determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

9. The device according to claim 8, wherein acquiring the first image set and the first annotation information includes:
   acquiring at least one input image collected in the use of the first version of the object verification model and a verification result corresponding to the at least one image, wherein the verification result indicates whether the at least one image includes the target object;
   including the at least one input image into the first image set; and
   determining the first annotation information based on the verification result.

10. The device according to claim 9, wherein acquiring the at least one input image comprises acquiring at least one of the following:
    a first input image that is determined by the object verification model to include the target object, wherein the first annotation information is determined to indicate that the first input image includes the target object,
a second input image that is determined by the object verification model to not include the target object, wherein the verification result of the object verification model is used to determine a permission, an object in the second input image is determined to have the permission, and the first annotation information is determined to indicate that the second input image includes the target object, and
a third input image that is determined by the object verification model to not include the target object, wherein an object in the third input image is determined to not have the permission, and the first annotation information is determined to indicate that the second input image does not include the target object,
a reference image that is provided for verification by the object verification model, wherein the first annotation information is determined to indicate that the reference image includes the target object.

11. The device according to claim 8, wherein updating the first version of the object verification model comprises:
training the first version of the object verification model using the first image set and the first annotation information to meet a first convergence condition of a first objective function; and
wherein updating the second version of the object verification model comprises:
training the second version of the object verification model using the second image set and the second annotation information to meet a second convergence condition of a second objective function, wherein the complexity of meeting the second convergence condition is greater than the complexity of meeting the first convergence condition.

12. The device according to claim 8, wherein updating the first version of the object verification model comprises:
updating the first version of the object verification model using training that is based on mini-batch stochastic gradient descent.

13. The device according to claim 8, wherein updating the first version of the object verification model comprises:
training the first version of the object verification model based on a preset learning rate using the first image set and the first annotation information, wherein the preset learning rate is less than a preset threshold.

14. The device according to claim 8, wherein the target object comprises a target face.

15. A computer program product tangibly stored on a non-transitory computer-readable medium and comprising computer-executable instructions, wherein the computer-executable instructions, when executed, cause a device to perform actions comprising:
acquiring a first image set and first annotation information, wherein the first annotation information indicates whether a corresponding image in the first image set includes a target object;
updating a first version of an object verification model using the first image set and the first annotation information to obtain a second version of the object verification model, wherein the first version of the object verification model has been deployed to determine whether an input image includes the target object;
determining the accuracy of the second version of the object verification model; and
updating, responsive to it being determined that the accuracy is lower than a preset accuracy threshold, the second version of the object verification model using a second image set and second annotation information to obtain a third version of the object verification model, wherein the number of images in the second image set is greater than the number of images in the first image set, and the second annotation information indicates whether a corresponding image in the second image set includes a desired object.

16. The computer program product according to claim 15, wherein acquiring the first image set and the first annotation information comprises:
acquiring at least one input image collected in the use of the first version of the object verification model and a verification result corresponding to the at least one image, wherein the verification result indicates whether the at least one image includes the target object;
including the at least one input image into the first image set; and
determining the first annotation information based on the verification result.

17. The computer program product according to claim 16, wherein acquiring the at least one input image comprises acquiring at least one of the following:
a first input image that is determined by the object verification model to include the target object, wherein the first annotation information is determined to indicate that the first input image includes the target object,
a second input image that is determined by the object verification model to not include the target object, wherein the verification result of the object verification model is used to determine a permission, an object in the second input image is determined to have the permission, and the first annotation information is determined to indicate that the second input image includes the target object, and
a third input image that is determined by the object verification model to not include the target object, wherein an object in the third input image is determined to not have the permission, and the first annotation information is determined to indicate that the second input image does not include the target object,
a reference image that is provided for verification by the object verification model, wherein the first annotation information is determined to indicate that the reference image includes the target object.

18. The computer program product according to claim 15, wherein updating the first version of the object verification model comprises:
training the first version of the object verification model using the first image set and the first annotation information to meet a first convergence condition of a first objective function; and
wherein updating the second version of the object verification model comprises:
training the second version of the object verification model using the second image set and the second annotation information to meet a second convergence condition of a second objective function, wherein the complexity of meeting the second convergence condition is greater than the complexity of meeting the first convergence condition.

19. The computer program product according to claim 15, wherein updating the first version of the object verification model comprises:
updating the first version of the object verification model using training that is based on mini-batch stochastic gradient descent.

20. The computer program product according to claim 15, wherein updating the first version of the object verification model comprises:
    training the first version of the object verification model based on a preset learning rate using the first image set and the first annotation information, wherein the preset learning rate is less than a preset threshold.

\* \* \* \* \*